United States Patent [19]

Bellmann et al.

[11] 4,404,371

[45] Sep. 13, 1983

[54] CARBOXYMETHYLCELLULOSE WITH CARBONATE BRIDGES AND PREPARATION THEREOF

[75] Inventors: Günter Bellmann, Commugny; Celeste Cervini, Carouge, both of Switzerland; Jean-Pierre Sachetto, Saint-Julien en Genevois, France

[73] Assignee: Battelle Memorial Institute, Carouge, Switzerland

[21] Appl. No.: 334,590

[22] Filed: Dec. 28, 1981

[30] Foreign Application Priority Data

Jan. 14, 1981 [CH] Switzerland ............................ 202/81

[51] Int. Cl.$^3$ ............................................. C08G 59/00
[52] U.S. Cl. ........................................ 536/98; 536/64; 536/85

[58] Field of Search .................................... 536/98, 85

[56] References Cited

U.S. PATENT DOCUMENTS

| | | | |
|---|---|---|---|
| 3,705,890 | 12/1972 | Barker et al. | 536/67 |
| 4,097,667 | 6/1978 | Holst et al. | 536/87 |
| 4,200,736 | 4/1980 | Shinohara et al. | 536/87 |
| 4,248,595 | 2/1981 | Lask et al. | 536/84 |
| 4,250,306 | 2/1981 | Lask et al. | 536/85 |

*Primary Examiner*—A. Lionel Clingman
*Attorney, Agent, or Firm*—Finnegan, Henderson, Farabow, Garrett & Dunner

[57] ABSTRACT

Cross-linked carboxymethylcellulose with intermolecular carbonate bridges.

9 Claims, No Drawings

CARBOXYMETHYLCELLULOSE WITH CARBONATE BRIDGES AND PREPARATION THEREOF

The present invention concerns carboxymethylcellulose (CMC) and, more especially, CMC containing intermolecular carbonate bridges. It is known that CMC is a cellulose product soluble in neutral or alkaline aqueous media because of the presence, mainly on the sixth carbon of the constituting glucopyranose units, of O-oxycarbonylmethyl groups, the degree of substitution of which (DS), i.e. the number of substituents per pyranose unit, is generally comprised between 0.2 and 1 (although it may, in some cases, exceed 1 and attain values of 2.5 to 3 when the substitution relates to other carbon atoms than the sixth carbon atom). Such CMC's provide, in aqueous media, high viscosity solutions (of the order of 20 to 2000 cP at 1% by weight) but there exists industrial needs for solutions of still significantly higher viscosities at lower concentrations (for instance of the order of several thousands cP at 1% or less). The applicants have thus recently disclosed a CMC product cross-linked by ester or anhydride cross-links in which the COOH and OH functions of CMC are involved. Such a cross-linked CMC is obtained by treating CMC with carbodiimides which are relatively expensive reagents. Hence, it was sought to provide cross-linked CMC's by means of other reagents, namely by means of alkyl chloroformates in the presence of a tertiary amine.

The base catalyzed reaction of cellulose derivatives and chloroformates in heterogeneous media is not new per se (see for instance "Preparation of Cellulose Carbonate" by S. A. BARKER et al, Carbohydrate Research 17 (1971), 471–474; British Pat. No. 1,565,989 (HOECHST)); however, these references have rather disclosed the formation during such a reaction, of either mixed alkyl and cellulose carbonates the action of which is mainly to provide water insolubility to the cellulose derivative, or of intra-molecular cyclic carbonates. Thus, French Pat. No. 2.073.901 discloses a method of preparation of intra-molecular cellulose carbonates by the reaction of cellulose with a chloroformate in anhydrous heterogeneous media. French Pat. No. 1.116.053 discloses the reaction of CMC with bifunctional compounds (a list of which compounds is given in a Table of said reference) so as to provide products with increased water solubility. It does not appear that cross-linking is taking place in any of the reactions contemplated in this reference and, further, none of the contemplated reagents seems capable to provide intermolecular carbonates. In the "Journal of the Textile Institute" 61 (1970) 597–603, there is disclosed the cross-linking of wool with carbodiimides or chloroformates dissolved in DMF (dimethyl formamide). However, this reference does not indicate that the bridges obtained from chloroformates can be carbonate bridges. U.S. Pat. No. 4,200,736 discloses the cross-linking of CMC with $CO_2$. There is postulated in this reference that the cross-links are probably due to carboxylate ester bridges of the —COOH functions of one carbohydrate chain with the —OH functions of another chain and it is never suggested that such bridges can be carbonate bridges, such an occurrence being actually highly improbable. Finally, there is further mentioned in Japanese Pat. No. A-68.22.880, of which an abstract is published in Chemical Abstracts 70 79324k, that the cross-linking of CMC by sodium chloroacetate will provide solutions with moderately increased viscosities and in French Patent Publication No. 2.003.895, there is disclosed the cross-linking of CMC by a variety of bifunctional compounds (of which a list is given at page 9, lines 22–30 of this reference), e.g. epichlorhydrin. However, none of the cross-linking compounds recited in the aforementioned references is capable of giving the CMC carbonate of the invention.

Now, regarding the reaction of CMC with chloroformates, the applicants have found that by working under homogeneous conditions, i.e. in solution, and by putting into reaction a CMC with a DS of about 0.2 to 1 (or going even up to 2.5) in an aqueous or aqueous-organic medium with a chloroformate in the presence of a tertiary amine, there are obtained products with such a high viscosity increase that this effect can only be explained by the existence of inter-molecular bridges between independent carbohydrate chains. Surprisingly, during such a reaction the original DS of the CMC used is only slightly modified which means that the number of COOH groups permanently involved is relatively small (for instance of the order of only 10% of all the COOH available). Also surprisingly, it appears from analytical results that such contributing carboxylic groups are not fundamentally responsible for the cross-linking that exists between the chains of CMC as they are found to be linked in the form of alkyl carboxylates (the alkyl group being that of the used chloroformates). The experimental facts supporting such observations will be presented hereinafter.

Moreover, the nature and the extent of cross-linking achieved appear to depend on the nature and the amount of base used for catalyzing the reaction as well as the relative quantities of starting CMC and chloroformate.

Yet, the mechanism of the present cross-linking reaction is still unknown. It is little probable that a simple direct intermolecular carbonate formation is involved by the reaction of one chloroformate molecule with the hydroxy functions of the CMC because, on the one hand, it does not seem that the formation of such cross-link bridges has been observed in heterogeneous media (see the recited references) and, on the other hand, the present applicants have noticed, as will be seen hereinafter, that in homogeneous medium a non-carboxymethylated cellulose (for instance hydroxyethylcellulose) reacts differently with chloroformates and does not seem to undergo any cross-linking.

On the contrary, since the groups COOH of CMC are at least in part in the form of carboxylate ions ($COO^-$) in the reaction of the invention and since it is well known (see the references listed hereinafter) that in heterogeneous media the reactivity of such ions is much higher than that of the hydroxy groups, it is more probable that a mixed anhydride of formula CMC—COO—COOAlk (I) will first form at least transitionally. This anhydride can thereafter react according to some schemes known to men skilled in the art and, particularly, from the following references: A. EINHORN, Ber 42, 2772 (1909); T. WIELAND et H. BERNHARD, Ann. 572, 190 (1951); D. S. TARBELL et N. A. LEISTER, J. Org. Chem. 23, 1149 (1958); T. B. WINDHOLZ, J. Org. Chem. 23, 2044, (1958)), according to the routes described below:

A. Reaction of anhydride (I) with the hydroxy function of one molecule of CMC (CMC'—OH) to form an ester bridge (II) or a mixed carbonate (III) as follows:

I+CMC'—OH→CMC—COO—CMC'(II)+Al-kOH

I+CMC'—OH→CMC—COOH+CM-C'—O—CO—OAlk (III)

Then reaction of the mixed carbonate (III) with the hydroxy of another molecule of CMC (CMC"—OH) and formation of a carbonate bridge (IV):

III+CMC"—OH→CMC'—O—COOCMC"(IV)-+AlkOH

B. Transesterification between (I) and an alcohol function of another molecule of CMC with the formation of another mixed anhydride (V):

I+CMC'—OH→CMC—COO—COO—CMC'(V-)+AlkOH followed by the dismutation of (V) into a carbonate (VI) analogous to the carbonate (IV) and a symmetrical anhydride (VII):

2V→CMC'—O—COO—CMC'(VI)+C-MC—COO—CO—CMC(VII)

Reaction of the anhydride (V) with a OH function of another molecule of CMC and formation of a carbonate bridge (VIII):

V+CMC"—OH→CMC"—O—COO—CMC'-(VIII)+CMC—COOH

C. Decomposition of the mixed anhydride (I) with the formation of an alkyl CMC-carboxylate according to:

I→CMC—COOAlk(IX)+CO₂

2I→CMC—COO—CO—CMC(VII)+(AlkO)₂-CO+CO₂

VII+(AlkO)₂CO→2IX+CO₂

Of course, the existence in the cross-linked CMC of the invention of ester (II) and anhydride (VII) bridges can not be, at priory, excluded completely. However, such kind of bridges has not been evidenced up to now for the following reasons: (1) the cross-link bonds are not stable to hot water which observation is not in favor of the presence of ester bridges of formula (II). (2) This hydrolysis reaction did not significantly increase the DS value (within the sensitivity limits of the measurements) which evidence is against the existence of anhydride bridges (VII). However, in view of the limits of sensitivity of the analyses, the existence of small proportions of such bridges cannot be excluded entirely.

Besides, it should be noted that, under hydrolysis, (I) should go back to the carboxyl group from which it originates with liberation of an alcohol and CO₂ or, alternatively, as seen above, it could rearrange to an alkyl carboxylate (CMC—COOAlk) with the formation of CO₂. Yet, the applicants have noted that the alkaline hydrolysis of the CMC cross-linked according to the invention will regenerate the starting CMC with its original DS value, which strongly suggests that the change undergone by the latter during cross-linking is indeed due to the formation of such alkyl CMC-carboxylate; this observation thus is also in favor of the initial formation of compound (I).

In the present invention, there can be used monofunctional chloroformates, for instance the chloroformates of methyl, ethyl, 2-chloroethyl, allyl, n-butyl, phenyl, benzyl, 2,2,2-trichloro-t-butoxycarbonyl, but also bis-chloroformates such as ethylene glycol bis-chloroformate, diethylene glycol bis-chloroformate, etc. For reasons of economy, ethyl chloroformate which is cheap is preferred.

As organic base catalysts, most of the common aliphatic or heterocyclic tertiary amines can be used such as triethylamine, pyridine, N-methylmorpholine, N-methyl piperidine, pyrazine, N-methyl pyrrole, N,N'-dimethyl piperazines, etc. Using pyridine is preferred.

The reaction is preferably carried out in an aqueous or aquo-organic solvent such as acetone or aqueous alcohol at room temperature. Generally, 0.02 to 1 equivalent of chloroformate is added to 1 equivalent of CMC (one equivalent of CMC corresponds to the molecular weight of a gluco-pyranose unit increased by that of the oxycarbonylmethyl substituent in proportion of the DS value) in water or in a mixture of water and a hydrocompatible solvent and, after stirring from a few seconds to a few minutes, a quantity of organic base is added. When a gel has formed, it is precipitated by dilution with the organic solvent and it is filtered by usual means. This gel can thereafter be further purified by redissolving into water and reprecipitation as above. In the above reaction, the amount of amine put into work can vary from a very small quantity (catalytic quantity) to about 1 equivalent per chloroformate equivalent.

EXPERIMENTAL PART

Example 1: Preparation of a water insoluble cross-linked product

Forty g of CMC of DS 0.73 (37.4 g dry, 0.17 mole, 0.127 mole of COOH; % H₂O 6.5; viscosity 160 cP (Brookfield) at 1% in water, 20° C./20 rpm, purity 99%) were dissolved in 1 liter of water. Acetone (800–900 ml) was slowly added to give an approximately 2% solution, pH 6.7. Under stirring at 20° C., 4.5 g (0.04 mole) of ethyl chloroformate dissolved in 10 ml acetone were added. After two min stirring, the pH was 6.6. Then, 0.1 g of pyridine was added, the mixture rapidly developed to a gel and the pH dropped to 5.7. After one min rest at this pH, 2.5 l of acetone were added to the mixture. The precipitate was dropped on a filter and washed with acetone. Then, it was dried in air. Yield 37.6 g with 7% H₂O, that is 35 g dry, i.e. a yield by weight of 93.5%. One g of this product would absorb 70 ml of demineralized water or 35 ml of 1% brine or urine. The apparent degree of substitution (DS) of the product was measured to be 0.67 by precipitating the corresponding uranyl salt according to the method published in "Bulletin VC-472 A," HERCULES Technical Data).

If the pyridine (0.1 g) was replaced by a 1:1 mixture of pyridine and N-methyl morpholine (0.1 g), a similar result was obtained.

If the acetone in the above reaction medium was replaced by ethanol, and if the precipitation was done by addition of ethanol, a similar product was obtained with the same yield.

Absorption Kinetics

The rate of absorption by the above product of a 1% NaCl solution under a pressure of 10 g/cm$^2$ was measured. This measurement was also effected on the same product, but after 3 hrs heating at 105°; and also on a commercial absorbent product (modified starch). The results of these measurements are summarized below for the first seven min of absorption.

| Time of the test (min) | Absorption in ml/g/min | | |
|---|---|---|---|
| | Crude product | Heated product 3 h at 150° C. | Commercial product modified starch |
| 1 | 1.5 | 3.6 | 2.2 |
| 2 | 1.8 | 5.1 | 3.1 |
| 3 | 2.0 | 6.0 | 3.9 |
| 7 | 2.0 | 8.0 | 5.7 |

From the above results, it was noted that the rate of absorption of the 1% by weight brine by the product of the invention, expressed per gram and per min, varied from about 1 to 5 ml.

Example 2: Preparation of a high viscosity cross-linked product

There was proceeded as in Example 1 but instead of adding 0.1 g of pyridine after 2 min, N-methylmorpholine was added portionwise (0.1 g) after 1 min, 2 min, 3 min and 4 min. After 5 min, a last 0.1 g portion of pyridine was added and, after 6 min, the mixture had set to a gel. After 6 further min, 2.5 l of acetone were added which caused the formation of a white flaky precipitated product. This precipitate was filtered, washed on the filter with acetone then dried in air. Crude product: yield 38.8 g (36 g dry), that is a yield by weight with reference to the starting CMC of 96.5%. Viscosity of the crude product: 3,500 cP at 1% (Viscotester HAAKE VT-02, 60 rpm) and 450 cP at 0.5%.

Purification: 17.8 g of crude product (16.4 dry) were dissolved in 3.5 l of water (concentration 0.5%). To the neutralized solution (initial pH of 5.0 brought to 6.8) there was added 2.5 times its volume of acetone under slow agitation. A light white precipitate formed. This precipitate was filtered on a wire mesh, it was washed with acetone and dried in air. There was obtained 10.8 g of purified product (10 g in the dry state). Yield by weight with reference to the starting CMC: 10/17=58.9%. Fractionated product: viscosity after 1 hr of a 0.5% solution by weight=15,000 cP (Viscotester HAAKE VT-02); after 12 hrs: 22,000 cP. If the purification (fractionation) is performed on a 1% by weight solution instead of on a 0.5% solution as above, the yield by weight is 62.7%. In this case, the viscosity (for a 0.5% solution) after 1 hr is 9,000 cP and, after 12 hrs, 9,500 cP. The apparent degree of substitution (DS) of the product was 0.68.

When the preparation was carried out as in this Example 2 but by replacing the acetone by equivalent volumes of ethanol, the crude product was obtained with a 90% yield which gave a solution viscosity (0.5%) of 400 cP (Viscotester VT-02). After purification, as above, with a water ethanol mixture, a purified product was collected with an overall yield (relative to the initial CMC) of 61%; the viscosity of this product (0.5% solution) was 16,000 cP after one hr and 20.000 cP after 12 hrs.

Example 3

The preparative steps of Example 2 were repeated using for each experiment 40 g of CMC (DS=0.7) and a series of chloroformates listed in appended Table I. The obtained results, i.e. the properties of the cross-linked CMC's thus obtained in the crude and in the purified state are also gathered in Table I.

Comparative experiment: Reaction of hydroxyethylcellulose with a chloroformate Four g of hydroxyethylcellulose (NATROSOL-250 MR, Hercules Inc., viscosity 4,500 cP at 2%, 25° C.) were dissolved in a mixture of 200 ml H$_2$O and 150 ml acetone. There was thus obtained a perfectly homogeneous solution with a neutral pH. To this were added under stirring 0.5 ml (0.57 mole) of ethyl chloroformate in 3 ml of acetone. Then, after stirring for 90 sec at room temperature, 1 drop of N-methylmorpholine was added and this addition was repeated each min for the four following minutes. At the fifth min, 1 further drop of pyridine was added and stirring was continued for 6 min after which an excess of acetone was added which caused the formation of a white precipitate. This product was filtered and dried, yield 3.65 g. After dissolving this product in water no viscosity increase was noted as compared with an equivalent concentration solution of the starting product.

Analytical Part

There was used a starting CMC with an original DS of 0.735 which was cross-linked according to the method of Example 2. After purification of the reaction product the DS thereof was 0.678. From which result it can be seen (0.735−0.678=0.057 and 0.057/0.735=0.08) that only 8% of the COOH groups of CMC were permanently involved in the course of the reaction with the chloroformate.

A hundred ml of a 0.5% by weight solution of this cross-linked CMC (viscosity 16,000, pH 6.6) were boiled for 14 hrs and it was noted that the viscosity which had first risen became very low after already 2 hrs. After 14 hrs, the viscosity was about 100 cP at room temperature, pH 5.9, DS 0.679. Thus, the DS kept unchanged during this rupture of the cross-linking bonds and it can be thus assumed that, in such cross-linking, the COOH groups inherent to the CMC were not involved to any detectable degree. Hence, most of these bridges cannot be anhydride or ester bridges. Only the existence of intermolecular carbonate bridges can explain the above reported observations.

The boiling treatment was repeated but with, in addition, 60 ml of 1 N NaOH. After cooling, the viscosity of the solution (pH=13) had become very low. Measuring the DS gave a value of 0.736 which indicates (within the limits of error of the method) that all the COOH groups of the cross-linked CMC (now no more cross-linked) are now free. It can thus be concluded that the groups that were split during this alkaline hydrolysis were alkyl carboxylate ester groups, i.e. the 8% of the COOH groups involved when the CMC was originally reacted with the chloroformate.

Five g of the cross-linked CMC were boiled under reflux in 180 ml of highly purified water at pH 4 while passing a current of high purity nitrogen through the solution. The nitrogen was then bubbled through a trapping bottle containing 25 ml of 0.2 molar barium hydroxyde solution. After 5 hours reflux, the reaction was stopped and a 5 ml aliquot of the trapping solution was filtered from the barium carbonate formed, diluted with 125 ml of pure water, alkalinized to pH 11 with 5 ml NH$_4$OH conc. and titrated with a 0.005 M solution of TITRIPLEX No. 3 (Merck) complexing agent using phtaleine purpur as the indicator (just before the end point, about 125 ml of alcohol were added to increase the sensitivity). From the result thus measured, it was inferred that the amount of CO$_2$ in the cross-linked CMC was about 0.8 to 1 mmole per mole of CMC. A blank run under exactly the same condition but using original non-cross-linked CMC showed the complete absence of CO$_2$ liberation.

drying, to 20 to 150 ml H$_2$O or to 10–75 ml 1% aqueous NaCl.

5. Cross-linked CMC according to claim 4, the absorption rate of which toward 1% aqueous NaCl is of the order of 1 to 5 ml/g.min under a pressure of 10 g/cm$^2$.

6. Cross-linked CMC according to claim 1, having a degree of susbtitution of COOH (DS) between 0.2 and 2.

7. A method for the preparation of the cross-linked CMC according to claim 1, comprising treating, in a homogeneous phase at room temperature, a CMC of DS from 0.2 to 2 said CMC being entirely dissolved in water or in a water-alcohol or water-acetone medium with a pH near neutrality, with 0.02 to 1 equivalent of alkyl chloroformate per equivalent of gluco-pyranose unit in the presence, as a catalyst, of a tertiary amine.

8. The method of claim 7, further comprising the steps of precipitating said cross-linked CMC with a hydro-compatible solvent from the reaction mixture, separating the precipitate, purifying said precipitate by redissolving in water and reprecipitating said cross-linked CMC with a hydro-compatible solvent.

9. The method of claim 7, wherein the tertiary amine used is pyridine or N-methylmorpholine.

TABLE I

Reaction of CMC (DS = 0.7) with chloroformates

| Type of chloroformate | Weight ratio chloroformate/CMC | Yield of crude product (%) | Viscosity of solution at 0.5% (cP) | Yield of fractionated product (%) | Viscosity of the fractionated product solution at 0.5% after 1h (cP) |
|---|---|---|---|---|---|
| Control | —/40 | 88 | 45 | 20 | 100 |
| Methylchloroformate | 4.9/40 | 91 | 380 | 56 | 17,000 |
| Ethylchloroformate | 4.5/40 | 96.5 | 450 | 58.9 | 15,000 |
| 2-Chloroethyl chloroformate | 7.4/40 | 88.75 | 350 | 61.3 | 15,000 |
| Allylchloroformate | 8/40 | 97 | 350 | 64.8 | 15,000 |
| n-Butylchloroformate | 7/40 | 88.5 | 330 | 60 | 8,500 |
| Iso-butylchloroformate | 7/40 | 90 | 350 | 61.2 | 7,500 |
| Phenylchloroformate | 8/40 | 88.75 | 290 | 54.1 | 10,000 |
| Benzylchloroformate | 8.8/40 | 86.75 | 450 | 56.4 | 15,000 |
| 2,2,2-Trichloro-t-butoxycarbonylchloroformate | 15.8/40 | 86.75 | 550 | 61.6 | 15,000 |

We claim:

1. Cross-linked carboxymethylcellulose (CMC) having cross-linking intermolecular bridges consisting mainly of carbonate bridges involving the primary or secondary hydroxy functions of the CMC chains.

2. Cross-linked CMC according to claim 1, which provides, with water, a gel or a solution of viscosity of the order of 10,000 to 20,000 cP at 0.5% by weight.

3. Cross-linked CMC according to claim 1, in which a proportion of the COOH groups is esterified with an alcohol or a phenol.

4. Cross-linked CMC according to claim 2, the absorptive capacity per gram of which amounts, after